Patented July 15, 1924.

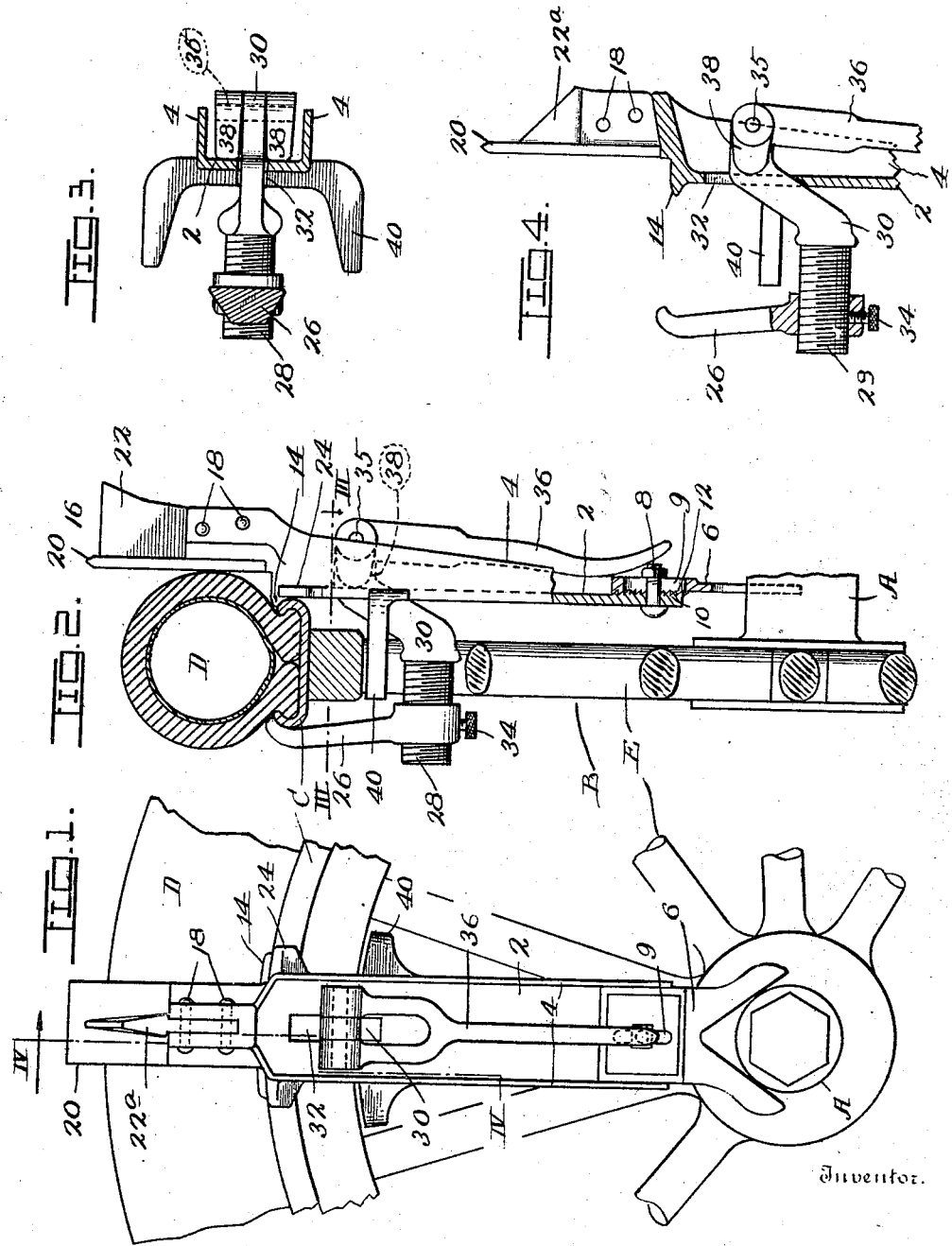

1,501,594

UNITED STATES PATENT OFFICE.

DAVID H. GOOD, OF KANSAS CITY, MISSOURI.

ANTISKID DEVICE.

Application filed May 3, 1923. Serial No. 636,487.

*To all whom it may concern:*

Be it known that I, DAVID H. GOOD, a citizen of the United States, residing at Kansas City, in the county of Jackson and State of Missouri, have invented certain new and useful Improvements in Antiskid Devices, of which the following is a specification.

My invention relates to antiskid devices for use on motor vehicle wheels to prevent the same from skidding on slippery, muddy, and sandy roads, and one object is to provide a simple and efficient device of this character which can be readily applied to the wheel without raising the same off the ground.

The device is so formed that it effectually prevents lateral as well as forward and backward skidding of the wheel and is, also, an aid to the traction in pulling out of mud holes and the like.

Other features will hereinafter appear, and in order that the invention may be fully understood, reference will now be made to the accompanying drawing, in which:

Fig. 1 is a broken side elevation of a wheel equipped with the device.

Fig. 2 is a broken vertical section of the wheel equipped with the device, which latter is shown in elevation and partly in section.

Fig. 3 is a horizontal section of the device removed from the wheel and taken on line III—III of Fig. 2.

Fig. 4 is an irregular broken vertical section on line IV—IV of Fig. 1.

In carrying out the invention, I employ an arm 2 reinforced at its longitudinal margins with flanges 4. One end of the arm 2 is provided with a hub-engaging member 6, which is bifurcated to straddle the hub A of the wheel B as shown by Fig. 1. The hub-engaging member 6 has a bolt-and-slot connection 8 and 9 with the arm 2, so that it may be adjusted to wheels of different diameters. Coengaging ratchet-like teeth 10 and 12 are formed on the respective faces of the arm 2 and the member 6 to relieve the bolt 8 of shearing stress. The bolt 8 is further relieved of shearing stress by a lip 14 formed integral with or otherwise fixed to the arm 2 and adapted to overlap the metal rim C of the wheel B.

The opposite end of the arm 2 from that equipped with the hub-engaging member 6 is provided with a nonskid member 16, which is firmly secured to the arm by suitable means such as rivets 18. The nonskid member 16 projects beyond the periphery of the tire D and consists of blades 20 and 22, the latter of which is arranged at an angle of, substantially, ninety degrees to the former.

Jaws 24 and 26 are provided for securing the arm 2 to the rim C of the wheel. The jaw 24 is fixed to the arm 2 adjacent to the lip 14, while the jaw 26 is threaded upon the threaded portion 28 of a connecting member 30, which extends through a slot 32 in the arm 2. A set screw 34 is provided to secure the jaw 26 at any point of its adjustment upon the threaded portion 28 of the member 30. The end of the connecting member 30 projecting through the slot 32 in the arm 2 is provided with a pin 35 upon which a lever 36 is mounted, said lever 36 being provided near its fulcrumed portion with fixedly mounted cams 38 adapted to bear against the arm 2 and cause the jaws 24 and 26 to firmly grip the rim C.

A fork 40 is fixed to the arm 2 to project between two of the spokes E, as a precautionary measure to prevent the jaws 24 and 26 from slipping on the rim C.

In practice the hub-engaging member 6 is adjusted longitudinally of the arm 2, to cause said member 6 to engage the hub A while the lip 14 engages over the rim C. The member 6 is then firmly secured to the arm 2 by tightening the bolt 8. After the hub-engaging member 6 has once been adjusted it need not be adjusted again as the arm will always fit the wheel after making the first adjustment as above stated. The jaw 24 is then placed against one side of the rim C while the movable jaw 26 is adjusted upon the threaded portion 28 of the member 30 until said jaw contacts the rim C, whereupon it is firmly secured to said threaded portion 28 by the set screw 8. Adjustment of the jaw 26 is effected while the lever 36 and its cams 38 are in inactive position. The lever 36 is then swung against the hub-engaging member 6 to cause the cams 38 to force the jaws 24 and 26 firmly against the opposite sides of the rim C, thereby reliably securing the antiskid device to the wheel B. Initial adjustment of the jaw 26 upon the threaded portion 28 is all that is necessary as after such adjustment the cams 38 when thrown to inactive position permits the jaw 26 to clear the rim C, so that the device can be removed from the wheel B.

When the device is mounted upon the wheel B, as above stated, the blade 20 prevents lateral skidding of the wheel while the blade 22 aids the traction and prevents backward or forward slippage of said wheel. In the device intended for the front wheel of the vehicle the blade 20 aids in steering a straight course on a muddy or slippery road and is reinforced by a member 22ª.

After the device has been properly adjusted to fit a wheel it can be applied or removed almost instantly without lifting the wheel from the ground, and when in active position will not damage the rubber tire.

Should the nonskid member 16 become damaged it can be readily replaced by another after removing the rivets 18.

From the foregoing description it will be understood that I have provided an antiskid device embodying the advantages above pointed out, and while I have shown and described the preferred construction, combination and arrangement of parts, I reserve the right to make such changes as properly fall within the spirit and scope of the claims.

Having thus described my invention, what I claim and desire to secure by Letters Patent, is:

1. An antiskid device of the character described consisting of an arm having means at one end for engaging the hub of a wheel and antiskid means at its opposite end, jaws associated with said arm to coact with the hub-engaging means in securing the device to a wheel, means associated with the arm to cause said jaws to firmly engage the opposite sides of the wheel, and means projecting laterally from the arm and extending between two spokes of the wheel to prevent radial movement of the arm.

2. An antiskid device of the character described consisting of an arm having means at one end for engaging the hub of a wheel and antiskid means at its opposite end, a jaw fixed to said arm and adapted to engage one side of the wheel, a movable jaw adapted to engage the opposite side of the wheel, a connecting member extending through a slot in the arm and upon which the movable jaw is threaded for lateral adjustment for wheels of different widths, and means for actuating said connecting member to cause the jaws to firmly grip the opposite sides of the wheel.

3. An antiskid device of the character described consisting of an arm having means at one end for engaging the hub of a wheel and antiskid means at its opposite end, jaws associated with said arm to coact with the hub-engaging means in securing the device to a wheel, means associated with the arm to cause said jaws to firmly engage the opposite sides of the wheel, and a fork on the arm for extending between two spokes of the wheel.

4. In a device of the character described, an arm, a jaw fixed to said arm, a connecting member extending through a slot in the arm, a movable jaw adjustably mounted upon said connecting member, a lever pivotally secured to the connecting member, and cam means fixed to said lever and adapted to engage the arm and cause the jaws to grip the opposite sides of a wheel.

In testimony whereof I affix my signature in the presence of two witnesses.

DAVID H. GOOD.

Witnesses:
L. J. FISCHER,
F. C. FISCHER.